United States Patent
Stienhans

(10) Patent No.: US 10,355,922 B1
(45) Date of Patent: Jul. 16, 2019

(54) AUTOMATED COMPUTING ARCHITECTURE CONFIGURATION SERVICE

(71) Applicant: Amazon Technologies, Inc., Seattle, WA (US)

(72) Inventor: Frank Stienhans, Menlo Park, CA (US)

(*) Notice: Subject to any disclaimer, the term of this patent is extended or adjusted under 35 U.S.C. 154(b) by 651 days.

(21) Appl. No.: 14/538,449

(22) Filed: Nov. 11, 2014

(51) Int. Cl.
*G06F 15/16* (2006.01)
*H04L 12/24* (2006.01)

(52) U.S. Cl.
CPC ...... *H04L 41/0806* (2013.01); *H04L 41/0853* (2013.01)

(58) Field of Classification Search
USPC .......................................... 709/222
See application file for complete search history.

(56) References Cited

U.S. PATENT DOCUMENTS

| | | | | |
|---|---|---|---|---|
| 8,566,803 | B2* | 10/2013 | Branson | G06F 11/3428 702/182 |
| 8,775,125 | B1* | 7/2014 | Aguiling | G06F 11/3433 702/186 |
| 8,818,787 | B2* | 8/2014 | Kejariwal | G06F 11/3419 703/22 |
| 9,128,739 | B1* | 9/2015 | Juels | G06F 9/45533 |
| 9,329,968 | B2* | 5/2016 | Pechanec | G06F 11/3428 |
| 9,354,939 | B2* | 5/2016 | Ferris | G06F 9/5072 |
| 9,432,267 | B2* | 8/2016 | Fall | G06F 9/45558 |
| 9,465,622 | B2* | 10/2016 | Jagatheesan | G06F 9/4401 |
| 9,519,481 | B2* | 12/2016 | Kumar | G06F 8/30 |
| 2005/0120341 | A1* | 6/2005 | Blumenthal | G06F 11/3428 717/158 |
| 2006/0230317 | A1* | 10/2006 | Anderson | G06F 11/3428 714/38.13 |
| 2006/0241931 | A1* | 10/2006 | Abu el Ata | G06Q 10/00 703/27 |
| 2007/0234365 | A1 | 10/2007 | Savit | |
| 2010/0030598 | A1* | 2/2010 | Kamalakantha | G06Q 10/06313 705/7.23 |
| 2010/0036698 | A1 | 2/2010 | Garrison et al. | |
| 2010/0125473 | A1* | 5/2010 | Tung | G06F 9/5072 709/200 |

(Continued)

OTHER PUBLICATIONS

Web Article: "Amazon EC2" published by Amazon [online] [retrieved on: Nov. 11, 2014] retrieved from: http://aws.amazon.com/ec2/, 6 pps.

(Continued)

*Primary Examiner* — Hamza N Algibhah
(74) *Attorney, Agent, or Firm* — Lee & Hayes, P.C.

(57) ABSTRACT

Functionality is disclosed herein for providing an automated computing architecture configuration service for creating, updating, or otherwise providing computing architecture templates. The automated computing architecture configuration service examines a set of computing specifications to correlate possible computing architecture configurations with the specifications, based on benchmarked performance results for existing computer architecture instances or possible instances. The correlation may subsequently be utilized to provide the computing architecture templates or a service proposal based on one or more computing architecture templates.

20 Claims, 10 Drawing Sheets

(56) References Cited

U.S. PATENT DOCUMENTS

| | | | | |
|---|---|---|---|---|
| 2010/0332262 | A1* | 12/2010 | Horvitz | G06F 9/5027 705/4 |
| 2011/0131335 | A1* | 6/2011 | Spaltro | G06F 9/5072 709/228 |
| 2011/0145392 | A1* | 6/2011 | Dawson | G06F 9/5072 709/224 |
| 2011/0295986 | A1 | 12/2011 | Ferris et al. | |
| 2011/0295998 | A1 | 12/2011 | Ferris et al. | |
| 2011/0296019 | A1 | 12/2011 | Ferris et al. | |
| 2012/0198073 | A1 | 8/2012 | Srikanth et al. | |
| 2012/0226573 | A1* | 9/2012 | Zakas | G06Q 30/0207 705/26.2 |
| 2012/0311128 | A1* | 12/2012 | Pechanec | G06F 11/3414 709/224 |
| 2012/0324445 | A1* | 12/2012 | Dow | G06F 9/45504 718/1 |
| 2013/0055250 | A1* | 2/2013 | Pechanec | G06F 11/3428 718/1 |
| 2013/0086270 | A1 | 4/2013 | Nishikawa et al. | |
| 2013/0111033 | A1 | 5/2013 | Mao et al. | |
| 2013/0159496 | A1* | 6/2013 | Hamilton | H04L 41/5032 709/224 |
| 2013/0346161 | A1* | 12/2013 | Mayerle | G06Q 10/06 705/7.39 |
| 2014/0013308 | A1* | 1/2014 | Gounares | H04L 41/0806 717/125 |
| 2014/0033268 | A1* | 1/2014 | Julisch | H04L 63/20 726/1 |
| 2014/0089511 | A1 | 3/2014 | McLean | |
| 2014/0280946 | A1 | 9/2014 | Mukherjee et al. | |
| 2014/0316925 | A1* | 10/2014 | Roberts | G06Q 30/0611 705/26.4 |
| 2014/0379930 | A1 | 12/2014 | Ferris | |
| 2015/0074659 | A1* | 3/2015 | Madsen | G06F 8/61 717/177 |
| 2015/0121155 | A1* | 4/2015 | Boshev | H04L 67/10 714/48 |
| 2015/0178107 | A1* | 6/2015 | Gummaraju | G06F 9/45558 718/1 |
| 2015/0268935 | A1* | 9/2015 | Muntes | G06F 8/20 717/105 |
| 2015/0278066 | A1* | 10/2015 | France | G06F 11/3452 709/224 |
| 2016/0070597 | A1* | 3/2016 | Riggin | G06F 9/5011 718/1 |
| 2016/0099847 | A1* | 4/2016 | Melander | H04L 41/5051 709/222 |
| 2017/0061339 | A1* | 3/2017 | Littlejohn | G06Q 10/0631 |

OTHER PUBLICATIONS

Web Article: "Amazon EC2 Product Details" published by Amazon [online] [retrieved on: Nov. 11, 2014] retrieved from: http://aws.amazon.com/ec2/details/, 13 pps.

Web Article: "AWS CloudFormation" published by Amazon [online] [retrieved on: Nov. 11, 2014] retrieved from: http://aws.amazon.com/cloudformation/, 5 pps.

Web Article: "AWS CloudFormation Product Details" published by Amazon [online] [retrieved on: Nov. 11, 2014] retrieved from: http://aws.amazon.com/cloudformation/details/, 8 pps.

Office Action for U.S. Appl. No. 14/538,538, dated Jun. 27, 2017, Steinhans, "Automated Computing Architecture Configuration Service," 27 pages.

Web Article: "AWS CloudFormation" published by Amazon [online], retrieved on Nov. 11, 2014 from http://aws.amazon.com/cloudformation/ (5 pages).

Web Article: "Amazon EC2 Product Details" published by Amazon [online], retrieved on Nov. 11, 2014 from http://aws.amazon.com/ec2/details/ (13 pages).

Web Article: "Amazon EC2" published by Amazon [online], retrieved on Nov. 11, 2014 from http://aws.amazon.com/ec2/ (6 pages).

Web Article: AWS CloudFormation Product Details published by Amazon [online], retrieved on Nov. 11, 2014 from http://aws.amazon.com/cloudformation/details (8 pages).

Office Action for U.S. Appl. No. 14/538,538, dated Oct. 10, 2017, Stienhans, "Automated Computing Architecture Configuration Service", 24 pages.

Office Action for U.S. Appl. No. 14/538,538, dated Sep. 19, 2018, Stienhans, "Automated Computing Architecture Configuration Service", 29 pages.

Office Action for U.S. Appl. No. 14/538,538, dated Apr. 9, 2018, Stienhans, "Automated Computing Architecture Configuration Service," 24 pages.

* cited by examiner

AUTOMATED COMPUTING ARCHITECTURE CONFIGURATION SERVICE

BACKGROUND

Distributed computing networks may provide a number of services that can be configured to provide different types of functionality. For example, a service provider network deploying a distributed computing network for use by customers may offer a number of different services. Each of the services may be selectable and configurable by a particular customer. Furthermore, a number of services may be configured by the same customer in order to generate a particular computing architecture.

Configuration of each of the services necessary to establish the particular computing architecture may be a time-consuming and complex process. Furthermore, if the customer desires the particular computing architecture to meet a baseline set of specifications, for example, performance or other metrics, it may be difficult for the customer to understand the interoperability of each individual service, and therefore, the overall performance metrics of each service as would be deployed. Accordingly, it may be difficult for a customer to preemptively determine performance metrics for a deployed computing architecture, or whether the computing architecture would consistently perform at or beyond those performance metrics.

The disclosure made herein is presented with respect to these and other considerations.

DETAILED DESCRIPTION

Figure 1:
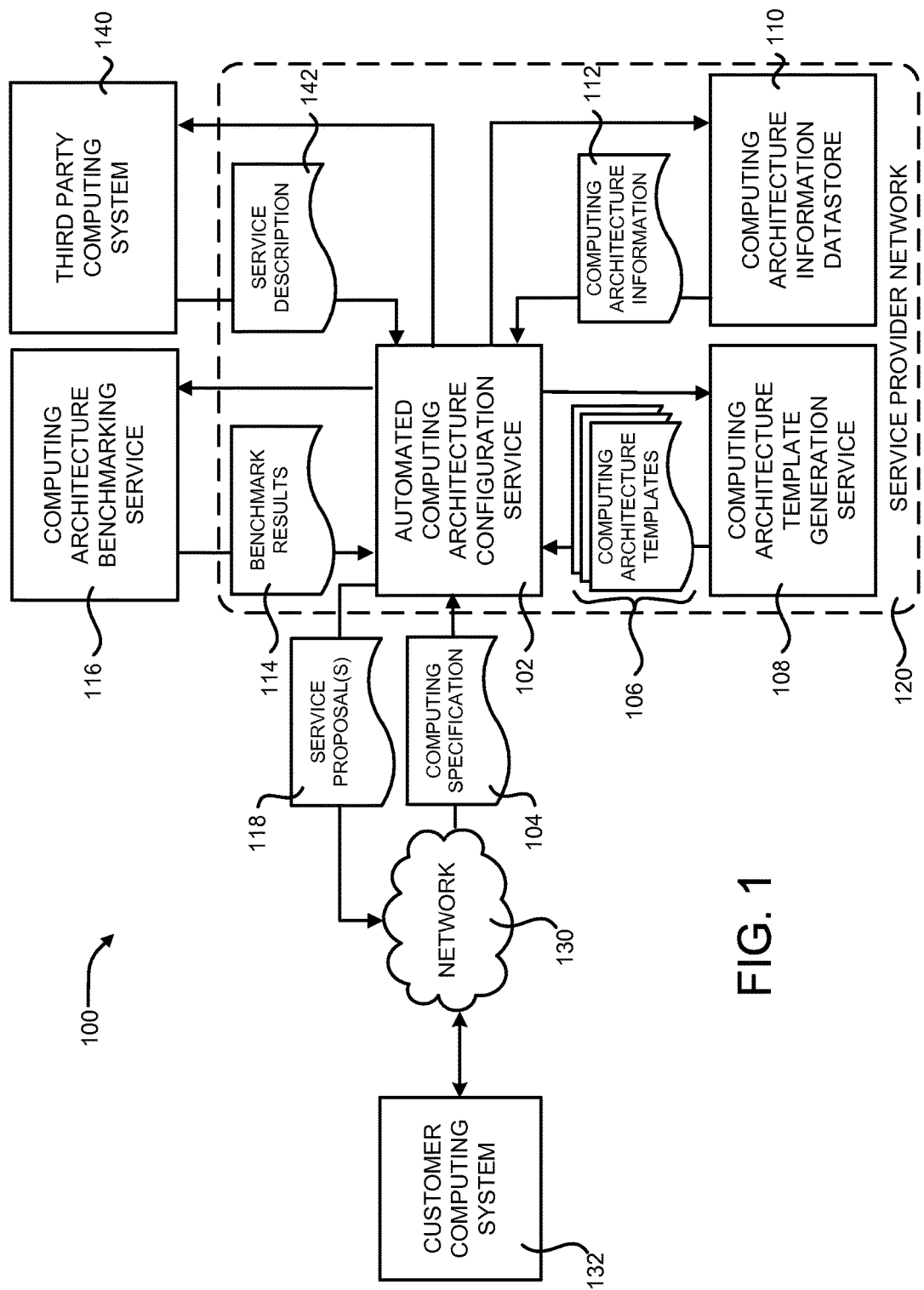
FIG. 1 is a system architecture diagram showing aspects of the configuration and operation of an automated computing architecture configuration service in one configuration presented herein.

The following detailed description is directed to technologies for providing an automated computing architecture configuration service. Utilizing the technologies described herein, an automated computing architecture configuration service can be implemented that provides functionality for generating one or more computing architecture templates describing computing architectures that can be deployed through a service provider network.

Generally, the computing architecture templates are data files describing one or more network resources or services provided by the service provider network. For example, the data files can include a description of resources, and any associated dependencies or runtime parameters, required to run the services or applications. The computing architecture templates can provide for relatively easy provisioning and updating of resources, services, applications, and other attributes of a computing architecture.

The computing architecture templates may be based, at least partially, on computing specifications, benchmarks, or service level agreements that describe a minimal level of service or performance guaranteed for the particular computing architecture described by each template. The computing architecture templates can be automatically generated upon receipt of the computing specification, benchmarks, or service level agreements. Additionally, benchmarks of existing computing architecture templates may be digested and compared to new customer-specific requirements or service level agreements to determine applicability, pricing differences, or other differences and similarities. The existing computing architecture templates meeting the customer-specific requirements or service level agreements can then be provided for selection by the customer, in a ranked and orderly manner, such that the customer may make an informed decision on what computing architecture and pricing is desired. Furthermore, guarantees as to the performance or minimal performance for any provided computing architecture template may also be provided with the description of pricing and performance of each particular computing architecture.

Upon selection of one or more computing architecture templates, the service provider network can automatically instantiate the computing architecture for the customer based on the selection from within the service provider network. Thereafter, the instantiated computing architecture can function based on any associated dependencies, attributes, and changes implemented by the customer. Pricing can be based on runtime, resource use, and other attributes, including minimal performance guarantees.

It should be appreciated that the functionality provided by the automated computing architecture configuration service might also be partially automated or supplemented by interactions with a customer and/or administrative user of the service provider network. For example, and without limitation, the failure to provide an appropriate computing architecture template or guarantees for any provided template to meet a required set of computing specifications may trigger intervention by the service provider network to determine additional computing architecture template solutions. Additional details regarding the various components and processes described above for implementing an automated computing architecture configuration service will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of an automated computing architecture configuration service 102 in one configuration presented herein. As shown in FIG. 1, and described briefly above, the automated computing architecture configuration service 102 might operate within or in conjunction with a service provider network 120, from which customers can purchase and utilize computing resources (which may be referred to herein as "resources"), such as virtual machine instances and/or other types of computing resources, from a service provider on a permanent or as-needed basis. The purchased computing resources can be instantiated from a computing architecture template 106 in some implementations. The computing architecture template 106 may be an existing template, may be an altered version of an existing template, or may be a newly automatically created template based on a computing specification 104 or service level agreement, benchmark results 114, or other attributes. The computing architecture template 106 may describe configurations of computing resources for deployment through the service provider network 120, as described briefly above.

Each type or configuration of a computing resource described in the computing architecture template 106 may be available from the service provider network 120 in different sizes. For example, a service provider might offer virtual machine instances or other types of data processing resources that are available for purchase and use that have many different configurations of processor capabilities, main memory, disk storage, and operating system. A service provider might also offer other types of resources for purchase and use by customers. For example, a service provider might offer hardware devices, database resources, file or block data storage resources, and/or networking resources, such as load balancing resources, DNS resources, virtual private cloud (VPC) resources, virtual local area network (VLAN) resources, and/or other types of hardware and software computing resources on a permanent or as-needed basis.

The service provider operating the service provider network 120 might also charge a fee for operating the resources to a customer that creates and uses the resources. The fee charged for a particular resource might be based upon the type and/or configuration of the resource. However, in some implementations, use of the automated computing architecture configuration service 102 and automatically created computing architecture template(s) 106 may not be based on a fee. For example, the fee charged for a particular resource might be based upon the amount of time the resource is utilized, rather than whether a computing architecture template 106 was used to instantiate or use the resource.

In the case of a data processing resource, like a virtual machine instance, the fee for use of the resource might be charged based upon the amount of time the resource is utilized. In the case of a data storage resource, the fee might be computed based upon the amount of data stored and/or the amount of data transferred into or out of the resource. The fees for other types of resources might also be based upon other considerations. A service provider might also utilize various purchasing models to determine the amount to charge a customer for use of resources provided by the service provider network 120.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks (WANs), such as the Internet. In the environment shown in FIG. 1, a service provider might operate one or more data centers configured to provide the resources in the service provider network 120 to its customers.

The resources described briefly above might also be provisioned and de-provisioned as needed in an automated fashion. For example, the service provider network 120 might instantiate a new instance of a computing resource, such as a virtual machine instance, in response to an increase in demand for a service. Other types of computing resources might also be provisioned and de-provisioned in a similar manner. The service provider network might also provide functionality for automatically scaling and/or de-scaling resources based upon demand for the resources or other factors. Scaling of resources may also be described within an associated computing architecture template 106, such that if a customer does not desire automated scaling, the same is not provided.

A customer or potential customer of the service provider network 120 might utilize a customer computing system 132 to communicate with the service provider network 120 over an appropriate data communications network 130. In this way, a customer computing system 132 may be utilized to provide computing specifications 104, to configure various aspects of the operation of the computing resources provided by the service provider network 120, or to otherwise control any computing resources being utilized by the customer. For example, and without limitation, a customer computing system 132 may be utilized to purchase computing resources in the service provider network 120, to configure aspects of the operation of the computing resources, and to perform other types of functionality with regard to the operation of the computing resources provided by the service provider network 120.

The customer computing system 132 may be any type of computing device capable of connecting to the service provider network 120 via a suitable data communications network such as, but not limited to, a laptop or desktop computer, a tablet computing device, a server computer, or a mobile telephone. Administrative users employed by the operator of the service provider network 120, such as administrators managing the automated computing architecture configuration service 102, may also connect with and utilize resources provided by the service provider network 120 in a similar fashion.

The service provider network 120 may also be configured to provide various network services for customer use. For example, and without limitation, the service provider network 120 may provide a virtual computer system service, a block-level data storage service, a cryptography service, an on-demand data storage service, a notification service, an authentication service, a policy management service, a task service and, potentially, other services. These and other services may be utilized together to implement various types of network-based applications that are instantiated through an appropriate invocation of computing architecture template 106. Additional details regarding one implementation of the service provider network 120 and the various types of network services that might be provided through the computing architecture template 106 will be provided below with regard to FIGS. 7-10.

As discussed briefly above, an automated computing architecture configuration service 102 is disclosed herein that operates within or in conjunction with the service provider network 120. The automated computing architecture configuration service 102 is a network service that provides functionality for automatically creating and/or editing a computing architecture template 106 in the service provider network 120.

The automated computing architecture configuration service 102 is configured to receive a computing specification 104, and return an appropriate service proposal 118 or proposals that specify at least one computing architecture template 106 based on the computing specification 104. The computing specification 104 may describe one or more attributes, performance metrics, or standard certifications of which a computing architecture is desired to meet or exceed. The automated computing architecture configuration service 102 processes and digests the computing specification 104 to determine an appropriate use-case, customer priorities, and/or other performance-attributes. The automated computing architecture configuration service 102 compares the use-case and customer priorities to benchmark results 114 provided by computer architecture benchmarking service 116. The operation of the computer benchmarking service 116 is described more fully below with reference to FIG. 4.

Depending upon the results of the comparison, the automated computing architecture configuration service 102 identifies one or more computing architecture templates 106 or information 112 describing the same that meet or exceed the computing specification 104. The computing architecture templates 106 may be generated and/or altered through a computing architecture template generation service 108. Furthermore, the computing architecture information, including pricing, use-cases, and other attributes may be stored and retrieved through a computing architecture information data store 110.

With regard to matching or exceeding the computing specifications 104, for example, the automated computing architecture configuration service 102 may search the benchmark results 114 for particular computing architectures that at least perform the capabilities desired. The automated computing architecture configuration service 102 may then assemble a list of one or more computing architecture templates 106 for proposed computing architectures, associate correlated benchmark results 114 in the list, associate pricing from the computing architecture information 112 based on use or other pricing structures in the list, rank the one or more computing architecture templates 106 of the list based on the previously identified customer priorities, and provide the list as a service proposal 118 to the customer through the customer computing system 132.

In addition to a basic service proposal describing computing architecture templates 106, correlated benchmarks 114, and associated pricing, the automated computing architecture configuration service 102 may further correlate third party service descriptions 142 retrieved from a third party computing system 140 to the list of computing architecture templates of the service proposal 118. Third party service descriptions 142 may also be correlated by the third party computing system 140, for example, based upon a provided computing architecture template 106 and/or computing specification 104. Third party services that are compatible with particular computing architectures and/or computing specifications 104 can then be added to the service proposals 118 to create a more formal proposal including any desirable third party service, and their associated pricing.

Accordingly, as described above, the automated computing architecture configuration service 102 and service provider network 120 may take up computing specifications 104 and provide meaningful service proposals 118 without requiring customers to perform tedious research into particular computing architectures. The customer can choose one or more of the service proposals 118 for deployment in the service provider network 120. Upon receipt of a selection, a corresponding computing architecture template 106 can be processed by a deployment system (such as a deployment service provided by the service provider network 120), and automatically deployed in the service provider network 120.

Additionally, accurate benchmark results 114 from existing computing architectures that can be deployed at the service provider network 120 provide useful metrics by which the operator of the service provider network 120 can offer guarantees as to a minimal level of performance for any benchmarked computing architecture deployed through the service provider network. Thus, the service proposals 118 include accurate descriptions of performance criteria for proposed computing architectures for deployment, and can aid a customer in choosing a particular service proposal.

Hereinafter, operation of the various services and technologies described above, including the automated computing architecture configuration service 102, the computer architecture benchmarking service 116, and the computing architecture template generation service 108, are described in detail with reference to FIGS. 2-6.

Figure 2:
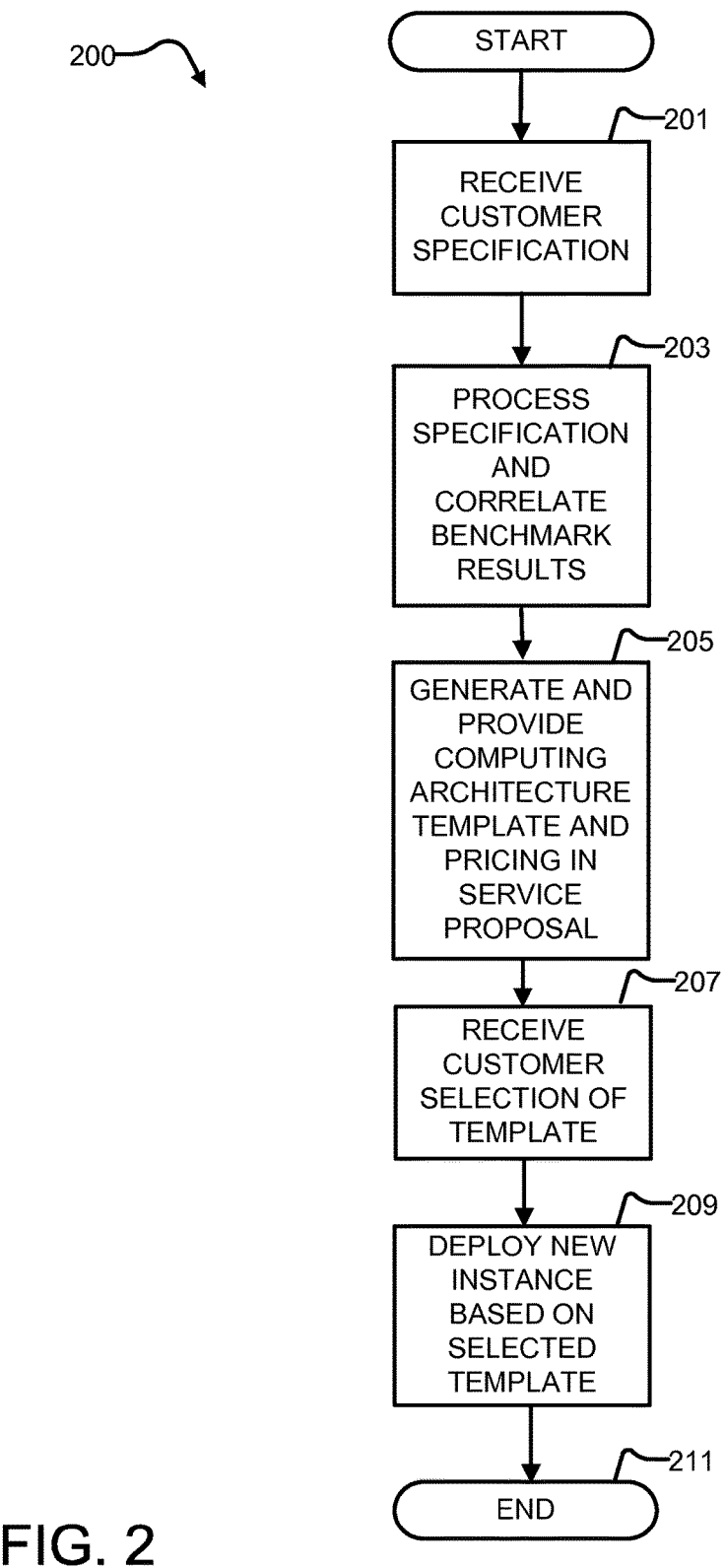
FIG. 2 is a flow diagram illustrating aspects of the operation of an automated computing architecture configuration service in one configuration described herein.

FIG. 2 is a flow diagram illustrating aspects of the operation of the automated computing architecture configuration service 102 in one configuration described herein. The method 200 illustrated in FIG. 2 includes receiving the computing specification, or specifications, 104, at block 201. As described herein, the computing specification 104 can also be termed a "user specification," or a "computing specification," and these terms may be used interchangeably herein.

As described above, the computing specification 104 includes a description of at least one attribute (or a set of attributes) defining operation or performance of a desired computing architecture to be deployed through the service provider network 120. The description can include a description of a region of operation for the deployed computing architecture. For example, performance and cost factors can be associated with operation of a computing architecture in a particular geographical region.

The computing specification 104 can further include installation options, installation coding or scripts, and initial data and/or computing attributes. The installation options and coding or scripts may be customer-defined, or based on existing installations. The initial data and computing attributes can include initial sizing data for a computing instance, initial memory requirements, initial processor requirements, and/or an initial number of host or server computers necessary to instantiate the computing architecture. The computing specification 104 can further include indication of whether or not a deployed computing architecture should be auto-scaled, for example, depending on usage or performance requirements. Auto-scaling can include, for example, scaling computing architecture capacity up or down automatically according to defined conditions. If auto-scaling is indicated, computing resources can increase seamlessly during demand spikes to maintain performance, and decrease automatically during demand lulls to reduce costs.

The computing specification 104 might further include a set or description of customer priorities. The priorities may be based on whether a particular computing architecture instance should conform to one or more industry standards or certifications, such as, for example, an enterprise resource planning standard based on Systems, Applications and Products in Data Processing (SAP® or HANA®). It should be appreciated that other industry standards and/or certifications may also be indicated.

The computing specification 104 can further include performance criteria or metrics. The performance criteria or metrics include, for example, steady input/output operations per second (IOPS), maximum IOPS, whether data volumes should be striped, particular types of storage necessary or desired, particular network services or interoperability desired, and other attributes.

The computing specification 104 can further include a description of desired services, such as private networking services, messaging services, backup services, storage services, or other services offered by the service provider network. Also, the computing specification 104 can include a description of a deployment environment, such as a virtual private cloud, and security parameters such as indication of a hardened operating system or other security parameters. The computing specification 104 can additionally specify a desired number of duplicate computing architectures, or other attributes.

Additionally, it should be understood that any metric or attribute describing any resource available through the service provider network 120 might also be applicable to the computing specification 104. Accordingly, the examples provided above are only indicative of some possible computing specifications, while not being exhaustive of all possibilities.

Upon receipt of the computing specification 104, the automated computing architecture configuration service 102 may process the received specification 104 to extrapolate the attributes and metrics described above. For example, extrapolating the attributes and metrics can include identifying individual attributes and metrics from the computing specification 104. The identified attributes and metrics may then be more easily compared, for example, through the correlation described below.

After extrapolation of the attributes and metrics, the automated computing architecture configuration service 102 can correlate the extrapolated attributes and metrics to benchmark results 114 to determine if any existing resources meet or exceed the computing specification 104, at block 203. Furthermore, the automated computing architecture configuration service 102 can correlate the extrapolated attributes and metrics to benchmark results 114 to determine if one or more proposed computing architectures meet or exceed the computing specification 104. As used herein, "existing resources" refers to resources that can be deployed through the service provider network 120. Furthermore, as used herein, a "proposed computing architecture" refers to a computing architecture that can be deployed through the service provider network 120.

The existing resources and/or proposed computing architecture (or plural architectures) may be described through computer architecture information 112 or an associated computing architecture template 106, in some implementations, and used for the correlations described herein. For example, if a computing specification specifies a minimum number of disk operations necessary to be performed per second, the automated computing architecture service 102 can identify one or more resources or computing architectures that exceed the minimum number of disk operations per second from the benchmark results 114. Additionally, if a computing specification specifies that a proposed computing architecture should include synchronous replication of virtual machine instances, the same can be identified through the benchmark results 114 and/or computing architecture information 112. In this manner, appropriate computing architectures can be identified that meet or exceed the computing specifications 104. It should be understood that other forms of correlation are also applicable, and are within the scope of this disclosure.

Thereafter, the automated computing architecture configuration service 102 can direct the computing architecture template generation service 108 to create a new template 106 or modify an existing template 106 based on the correlation to benchmark results 114. For example, individual resources meeting or exceeding the computing specification 104 can be added to a computing architecture template as individual invocations of the individual resources.

The computing architecture template 106 is a data file, as described briefly above. The data file includes a semantic description useable by the service provider network 120 to instantiate an instance of a computing architecture, including the proposed computing architecture and/or existing resources correlated based on the benchmark results 114. The semantic description may be consumable by a deployment system in the service provider network 120 to instantiate the resources and/or proposed computing architecture. Thus, adding the individual resources and/or proposed computing architecture may include, for example, adding individual invocation text structured according to a programming language or API calls that are decipherable by the service provider network 120 or any associated resource managers, or deployment services, deployed therein.

The created or modified computing architecture template 106 and associated pricing can then be packaged as a portion of a service proposal 118, at block 205. Additional information related to pricing structures and/or other information related to the computing architecture template 106 is retrieved from computing architecture information 112, and added to the service proposal 118, as appropriate. The service proposal 118 can include a description of each correlated and newly created/updated computing architecture template 106 (e.g., if more than one correlation that meets or exceeds the computing specification 104 is identified), associated benchmark results 114, associated pricing, and other suitable information. The service proposal 118 is then transmitted to the requesting customer.

The automated computing architecture configuration service 102 may then receive a selection of at least one service proposal of the service proposals 118 from the customer, at block 207. A new computing architecture instance, based on the selected service proposal 118, may then be instantiated or deployed through the service provider network 120 according to the a computing architecture template indicated in the selected service proposal 118, at block 209, and the method 200 may cease at block 209.

It should be understood that the method 200 can include more or fewer operations than those described with reference to FIG. 2. For example, the method 200 can include implementing pricing structures based on the received selection such that the customer is charged a fee for deploying the new computing architecture instance. The pricing structure and fee can be implemented as described above, for example, being implemented as a fee related to an amount of time or amount of resources used per unit of time, by the customer. Thus, the fee can be charged as an amount of currency per unit time of operation of the new instance of the computing architecture. Other types of fee structures might also be utilized.

As described above, a computing specification 104 may be used by the automated computing architecture configuration service 102 to generate or modify a computing architecture template 106 based on the computing specification 104 and benchmark results 114. It should be understood, however, that the computing specification 104 may not describe all attributes necessary to create a particular computing architecture or may only include attributes necessary to ensure a particular minimum level of performance. Thus, the automated computing architecture configuration service 102 may also determine appropriate attributes not particularly described through the computing specification 104 for use in designing, creating, and/or updating a computing architecture template. This is described more fully with reference to FIG. 3, below.

Figure 3:
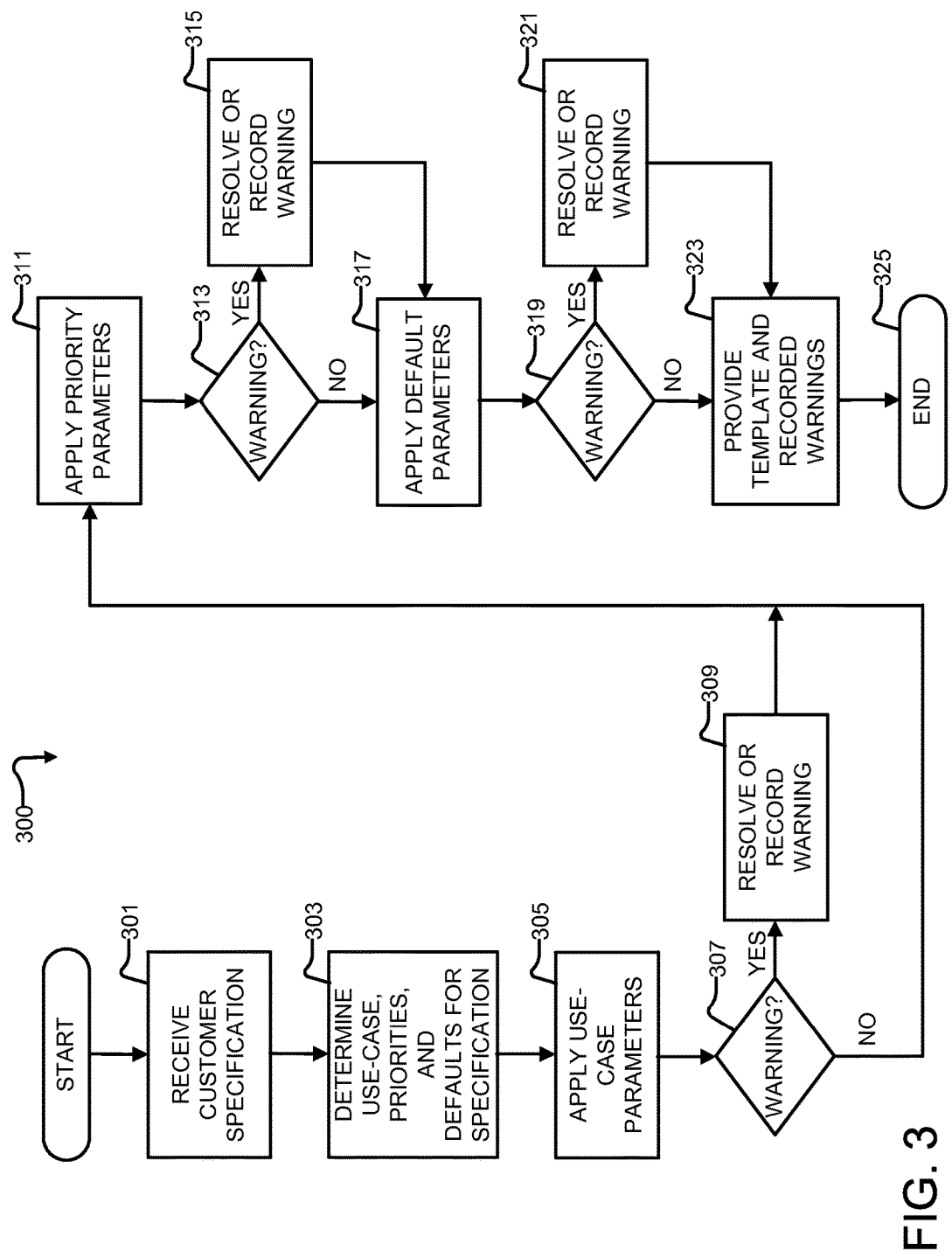
FIG. 3 is a flow diagram illustrating aspects of the operation of a computing architecture template generation service in one configuration disclosed herein.

FIG. 3 is a flow diagram illustrating aspects of the operation of a computing architecture template generation service 108, in one configuration disclosed herein. The method 300 of creating a computing architecture template 106 includes receiving a computing specification 104, at block 301. The computing specification 104 may describe at least one of the attributes or priorities described above, for example. The computing architecture template generation service 108 may extrapolate the at least one attribute and/or customer priority from the computing specification 104, at block 303. For example, extrapolating the attributes and customer can include identifying individual attributes and priorities from the computing specification 104. The identified attributes and priorities may then be more easily compared to benchmark results 114.

The computing architecture template generation service 108 may further determine, either through examination of the computing specification 104 or computing architecture information 112, appropriate use-cases, associated priorities, and/or defaults for stable operation of a computing architecture instance, at block 303.

Thereafter, the computing architecture template generation service 108 may sequentially apply the use-case parameters, the priority parameters, and the default parameters as invocations of resources in the computing architecture template 106 and resolve or record any associated warnings, at blocks 305-321. For example, the computing architecture template generation service 108 may first apply use-case descriptions as invocations in the computing architecture template at block 305. A determination may then be made as to whether the use-case descriptions generate an error or warning, at block 307. For example, a warning may be caused by a lack of adherence to a specified computing architecture, an error in dependencies (whether structural, data related, or other types of dependencies), or any other issue that may cause a malfunction or operation of the computing architecture in an undesirable or unintended manner. Additionally, warnings or errors may be based on different levels of severity dependent upon, for example, critical malfunctioning probability, fatal or non-fatal operation probability, and any other suitable level of severity.

If a warning is generated, the method 300 can include resolving or recording the warning at block 309. For example, if a warning is a non-fatal warning that would still allow the computing architecture to function normally, the warning may be recorded for later display to a requesting customer. However, if a warning would cause a malfunction or other serious error, the computing architecture template generation service 108 may attempt to resolve the warning by implementing alternate use-cases or requesting assistance from a user or administrative user of the service provider network 120 to resolve the warning.

Thereafter, the computing architecture template generation service 108 may apply priority descriptions to any non-filled parameters left in the computing architecture template 106, at block 311. Subsequently, any associated warnings may be determined at block 313. If warnings, as described above, related to the priority descriptions are detected, the computing architecture template generation service 108 may attempt to resolve or record the warnings, at block 315, or request assistance if automated warning resolution at block 315 is not successful.

Thereafter, if any further parameters are necessary to appropriately instantiate a computing architecture through the service provider network 120, the computing architecture template generation service 108 may apply standard or default values to those further parameters in the computing architecture template 106, at block 317. Additionally, any associated warnings may be determined at block 319. If warnings, as described above, related to the standard or default values are detected, the computing architecture template generation service 108 may attempt to resolve or record the warnings, at block 321, or request assistance if automated warning resolution at block 321 is not successful.

In this manner, a fully functioning computing architecture can be instantiated based first on an appropriate use-case, with other architecture dependencies being satisfied through customer or previously identified priorities, and system defaults. The created template 106 and any associated recorded warnings may then be provided to the automated computing architecture configuration service 102, at block 323, and the method 300 may cease at block 325.

Figure 4:
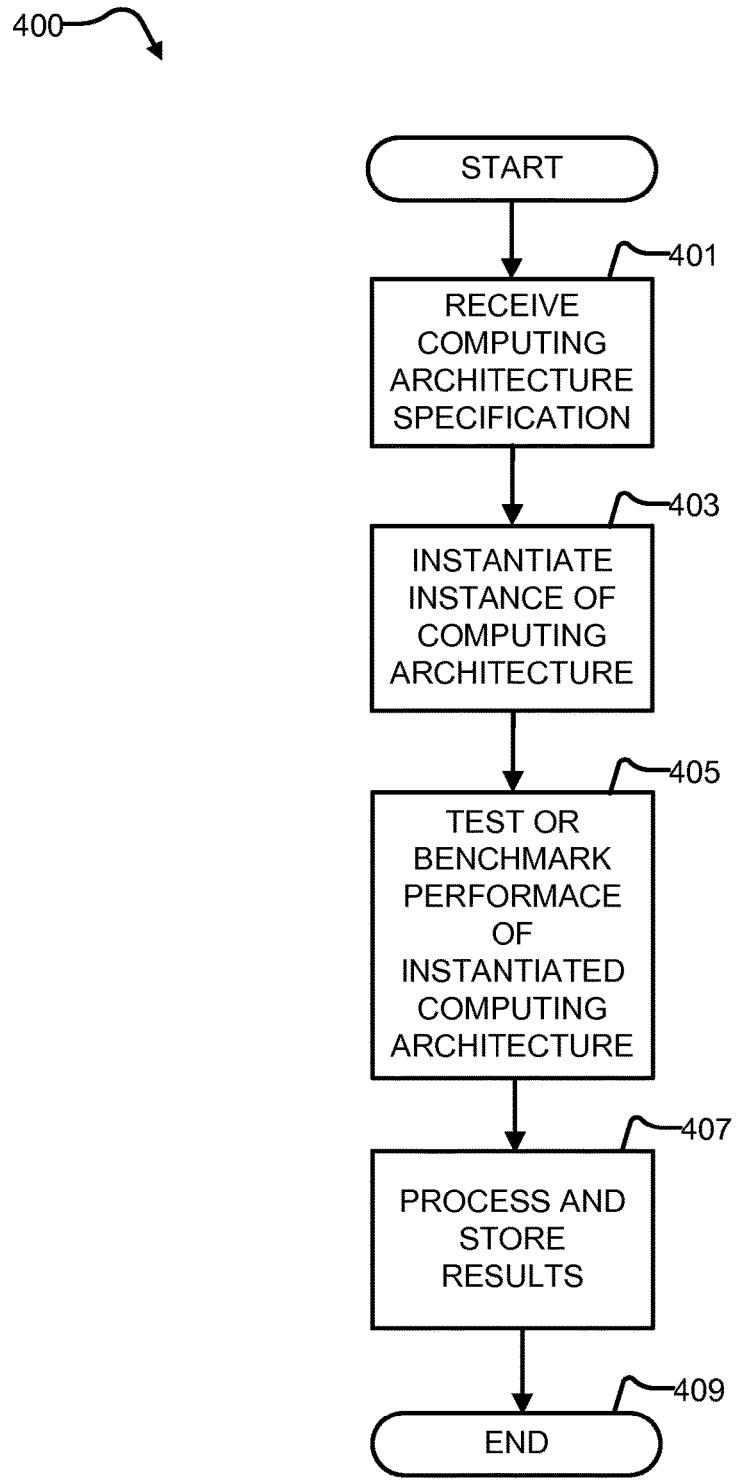
FIG. 4 is a flow diagram illustrating aspects of the operation of a computing architecture benchmarking service in one configuration disclosed herein.

As described above, the created computing architecture template 106 may be based on, at least, comparison and correlation to benchmark results 114. The benchmark results 114 may be provided by the computing architecture benchmarking service 116, in one implementation. FIG. 4 is a flow diagram illustrating aspects of the operation of the computing architecture benchmarking service 114, in one configuration disclosed herein.

The method 400 illustrated in FIG. 4 includes receiving a computing architecture specification at block 401. For example, the computing architecture specification may include an appropriate computing architecture template 106 in one configuration. The received computing architecture specification can also include additional information retrieved from computing architecture information 112, in some implementations.

Thereafter, the computing architecture benchmarking service 116 may instantiate an instance of the computing architecture described by the computing architecture specification, at block 403. The instance may be deployed at the service provider network 120, for example, or through a customer computing system 132 in other implementations. The computing architecture benchmarking service 116 may then test or benchmark the performance of the instantiated computing architecture instance at block 405, and process and store the benchmarking results 114 at block 407. The benchmarking may be based on any known or desired benchmarking protocol, and may include performance metrics (including minimum and maximum thresholds) for the instantiated computing architecture instance.

Additionally, testing may include, in one implementation, testing of computing architectures not directed related to a computing specification 104 or customer request. For example, the computing architecture benchmarking service 116 may test network resources, proposed computing architectures, existing computing architectures, infrastructure of the service provider network 120, and/or any other feature related to the service provider network 120. The testing may facilitate maintenance of the service provider network 120, updates to computing architecture information 112, updates to benchmarking results 114, or any other suitable technology. Testing can also include security testing and quality testing of any component, or testing to ensure each tested component provides an associated functionality correctly.

Upon processing the benchmarking and/or testing results 114, the method 400 may cease at block 409.

Additionally, it should be understood that the computing architecture benchmarking service 116 may initiate benchmarking based on other events, rather than just receipt of a computing architecture specification at block 401. For example, the computing architecture benchmarking service 116 can also benchmark based on changes or updates to the infrastructure of the service provider network 120. In this case, a flag, message, or other indication of a change to the infrastructure of the service provider network 120 may be received by the computing architecture benchmarking service 116. Responsive to the received indication, the computing architecture benchmarking service 116 may instantiate instances of previously benchmarked computing architectures for new benchmarking statistics. Thus, new benchmarking results 114 based on the updated infrastructure may be obtained, thereby ensuring that accurate performance criteria are maintained for a variety of computing architectures across updated and changed infrastructures.

The benchmark results 114 may be processed by the automated computing architecture configuration service 102, applied to computing architecture information 112 and stored at computing architecture information datastore 110, or otherwise be processed through the service provider network 120. In at least one implementation, the benchmark results 114 and associated computing architecture specification or template 106, are stored or linked to one another, for future correlations and matching by the automated computing architecture configuration service 102.

Figure 5:
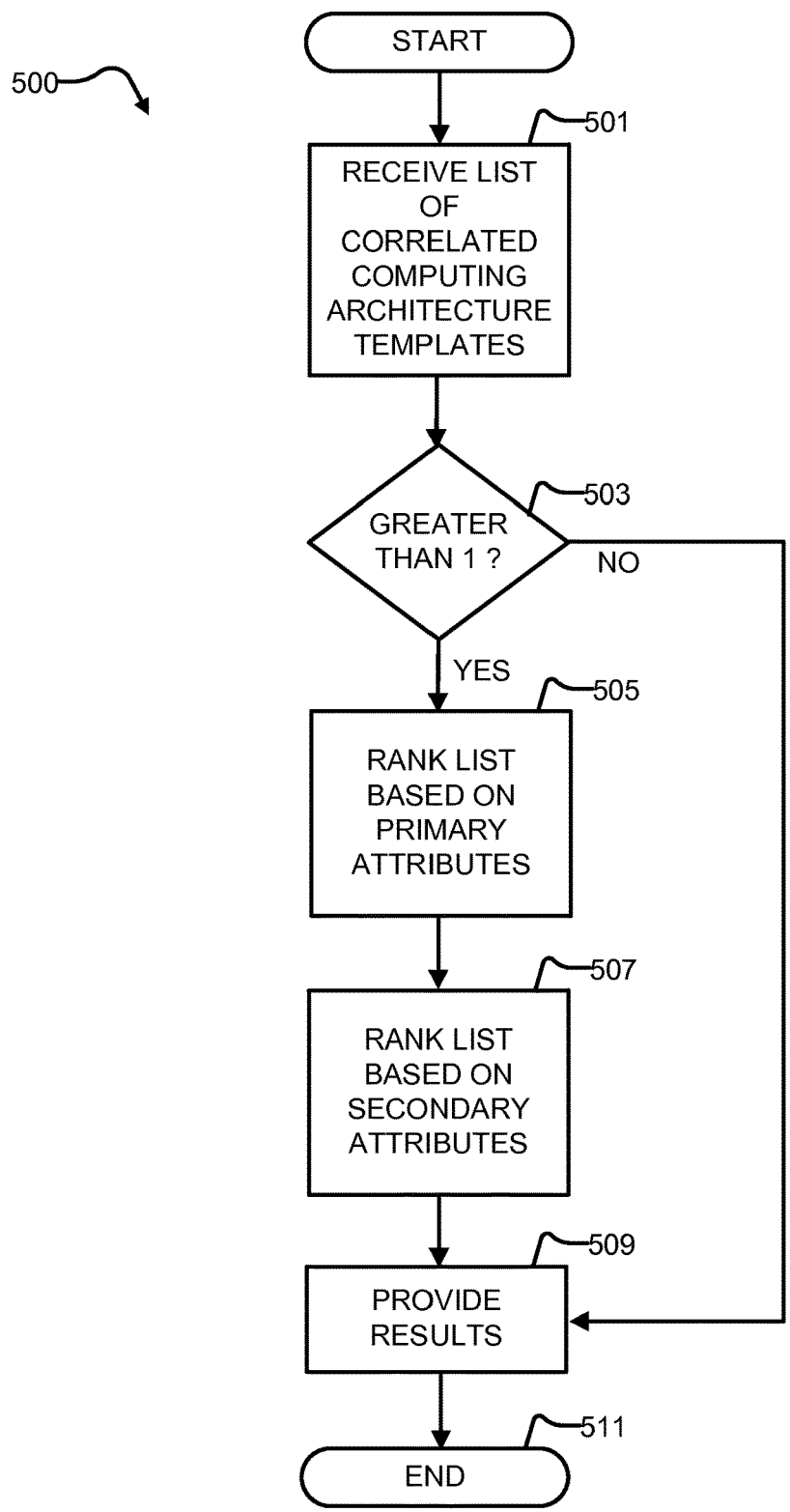
FIG. 5 is a flow diagram illustrating aspects related to organizing and ranking computer architecture templates by the automated computing architecture configuration service, according to one configuration disclosed herein.

As described above with reference to block 205 of FIG. 2, the automated computing architecture configuration service 102 may organize a list of at least one computing architecture template 106, pricing, and benchmark results 114 for creation of a service proposal 118. FIG. 5 is a flow diagram illustrating aspects related to organizing and ranking computer architecture templates by the automated computing architecture configuration service 102, according to one configuration disclosed herein. The method 500 may include receiving a list of correlated computing architecture templates, at block 501. The list may be based on the correlating with benchmarks 114 described above, and may include one or more computing architecture templates 106 meeting or exceeding the computing specification 104.

If the list of correlated computing architecture templates 106 is determined to include a single template at block 503, the automated computing architecture configuration service 102 returns the single template at block 509, and the method 500 ceases at block 511. However, if the list of correlated computing architecture templates 106 includes more than one template, the automated computing architecture configuration service 102 ranks and organizes the list for display to a customer.

The automated computing architecture configuration service 102 may initially rank the list of correlated computing architecture templates based on a set of primary attributes at block 505, may subsequently rank the list of correlated computing architecture templates based on a set of secondary attributes at block 507, and may return the ranked results at block 509.

The set of primary attributes may include a set of attributes necessary to be implemented to meet or exceed the computing specification 104. For example, a primary attribute may include a particular rate of IOPS, minimum storage requirements, or minimum memory throughput. Other primary attributes may also be applicable depending upon any particular computing specification 104.

The set of secondary attributes may include a set of attributes not entirely necessary to be implemented to meet or exceed the computing specification 104. For example, a secondary attribute may include a range of processor speeds that are all above a particular threshold, or a range of memory sizes that all exceed that computing specification 104. It is noted that other secondary attributes may also be applicable depending upon any particular computing specification 104.

The ranked results provided at block 509 may include additional pricing information as retrieved from computing architecture information 112. Furthermore, according to at least one implementation, the ranked results provided at block 509 may further include third party services and pricing information, as described briefly above.

Figure 6:
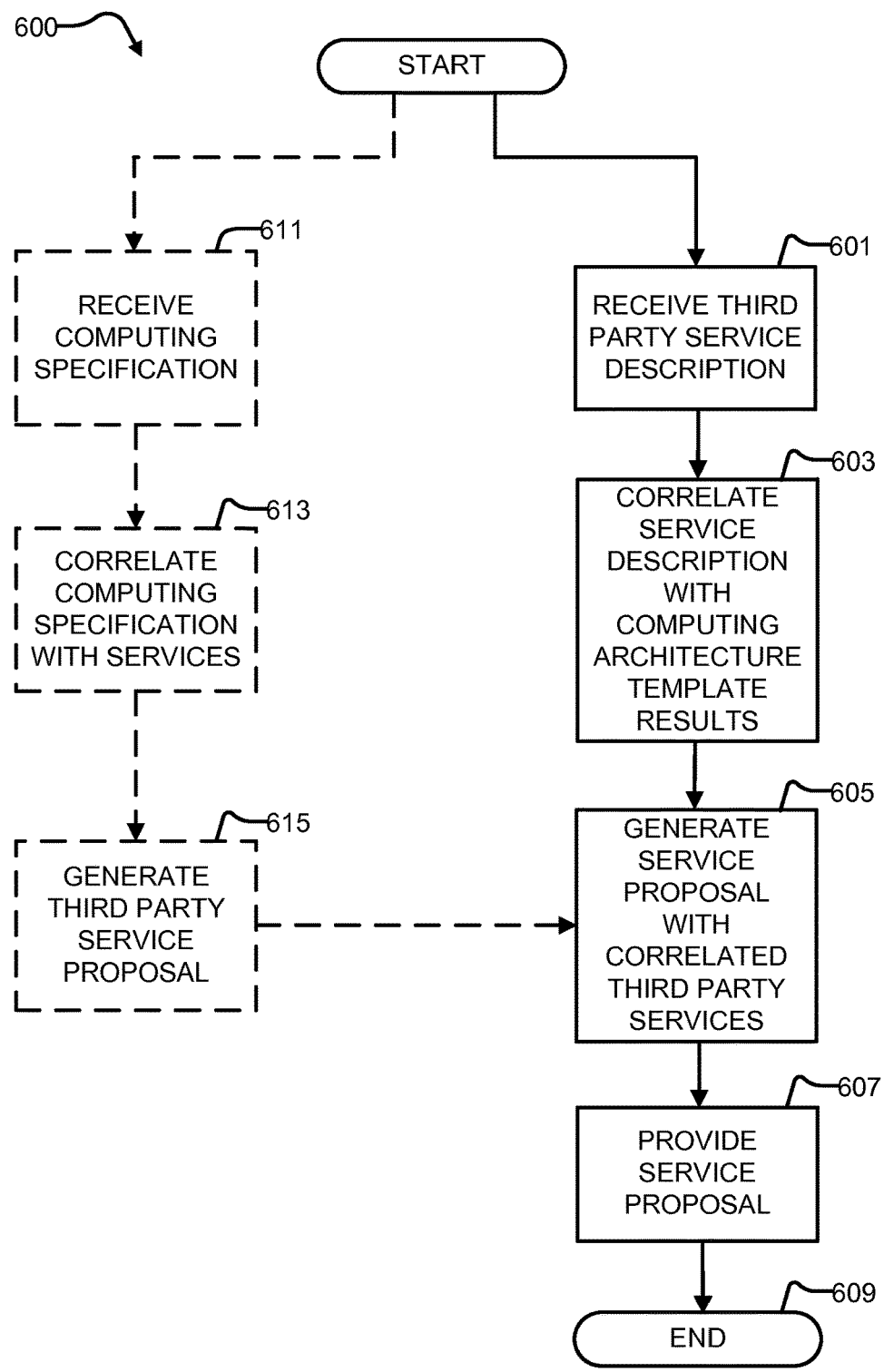
FIG. 6 is a flow diagram illustrating aspects related to correlating third party services with computing specifications by the automated computing architecture configuration service, according to one configuration disclosed herein.

FIG. 6 is a flow diagram illustrating aspects related to correlating third party services with computing specifications by the automated computing architecture configuration service 102, according to one configuration disclosed herein. The method 600 includes receiving third party service description 142, at block 601. The third party service description 142 may include a description of more than one service, or a single service. Furthermore, the third party service description 142 may include any associated attributes, including attributes somewhat similar to the attributes described above with reference to the computing specification 104, or to computing architecture information 112. Third party services can include any suitable service offering from a third party, including, but not limited to, services for maintaining the computing architecture created for a customer, installation or updating of applications, drivers, and/or software for a customer, or any other third party service.

The automated computing architecture configuration service 102 may subsequently correlate the third party service description 142 with computing architecture template results from block 509, at block 603. The correlation can include comparisons of compatible attributes based on the service description 142 and ranked results of computing architecture template or templates.

Thereafter, the automated computing architecture configuration service 102 may generate or supplement the service proposal 114 using the correlated third party service description 142, at block 605. The supplemented service proposal 114 may then be provided by the automated computing architecture configuration service 102 at block 607, and the method 600 may cease at block 609.

Alternatively, third party services may be correlated to computing specification 104 and/or a computing architecture template 106 by the third party computing system 140. For example, the third party computing system 140 may receive the computing specification at block 611. The third party computing system 140 may process the computing specification 104 in a similar manner as described above, to determine if there are any available third party services related to the computing specification. The third party computing system 140 may correlate third party services with the computing specification at block 613.

The correlating may include identifying any third party computing architecture elements offered by the third party. Third party computing architecture elements may include, for example, network resources offered by the third party, network services offered by the third party, or any suitable third party function that can be added to a computing architecture template for instantiating a computing architecture through the service provider network 120 and third party computing system 140.

Furthermore, the correlating may include determining a pricing structure of the correlated third party services and/or third party computing architecture elements. Thereafter, any correlated third party services and/or third party computing architecture elements may be organized into a third party service proposal, at block 615.

This third party service proposal, including any pricing structures, third party computing architecture elements, and/or third party service descriptions, may then be transmitted to the automated computing architecture configuration service 10 in a similar manner to transmission of the third party service description 142, described above. Thereafter, the automated computing architecture configuration service 102 can process the third party pricing structures, third party computing architecture elements, and/or third party service descriptions to create the service proposal 118, at block 605. It is noted that if any third party computing architecture elements are correlated with the computing specification 104, the correlated third party computing architecture elements may be added to the computing architecture template 106 in a similar manner as to adding network services and resources to the template, as described in detail above.

As described above, an automated computing architecture configuration service, illustrated as service 102, can be implemented that provides functionality for generating one or more computing architecture templates 106 describing computing architectures that can be deployed through the service provider network 120. Alternative implementations of the particular examples described above are also possible, and are within the scope of this disclosure. Furthermore, different operating environments and computing devices may be used to implement some or all of the functionality described herein. Hereinafter, non-limiting examples of possible operating environments and computing devices are described more fully with reference to FIGS. 7-10.

Figure 7:
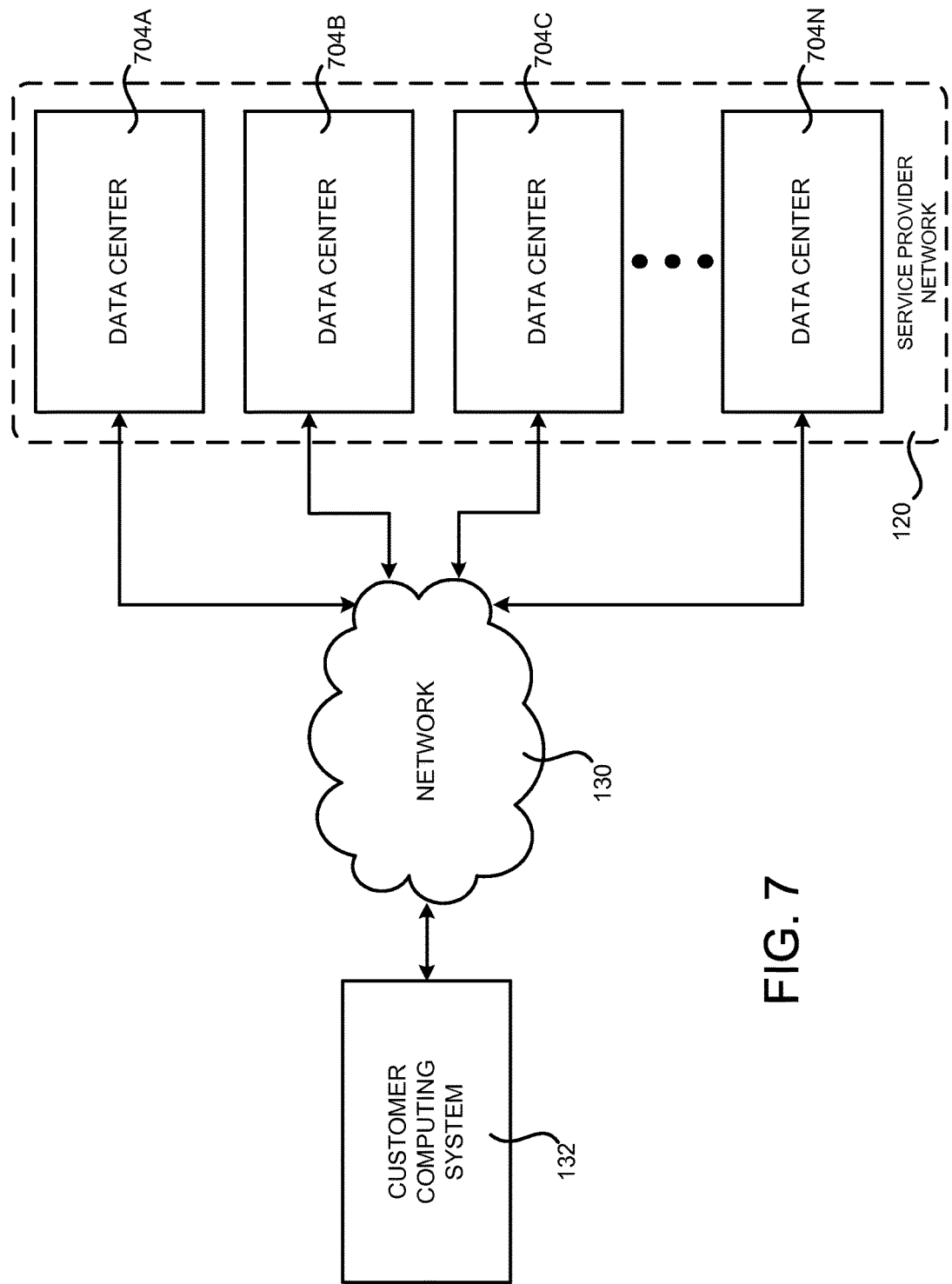
FIG. 7 is a system and network diagram that shows an illustrative operating environment for the various technologies disclosed herein that includes a service provider network that may be configured to implement aspects of the functionality described herein.

FIG. 7 is a system and network diagram that shows one illustrative operating environment for the configurations disclosed herein that includes a service provider network 120 that may be configured to provide an automated computing architecture configuration service 102 in the manner described above, according to one configuration disclosed herein. As discussed briefly above, the service provider network 120 can provide computing resources that may be instantiated through a computing architecture template 106, on a permanent or an as-needed basis.

The computing resources provided by the service provider network 120 may include various types of computing resources, such as data processing resources, data storage resources, networking resources, data communication resources, and the like. Each type of computing resource may be general-purpose or may be available in a number of specific configurations. For example, and as described briefly above, data processing resources may be available as physical computers or virtual machine instances in a number of different configurations. The virtual machine instances may be configured to execute applications, including Web servers, application servers, media servers, database servers, and other types of applications. Data storage resources may include file storage devices, block storage devices, and the like. As discussed briefly above, the service provider network 120 might also be configured to provide various network services.

The computing resources provided by the service provider network 120 are enabled in one implementation by one or more data centers 704A-704N (which may be referred herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 might also be located in geographically disparate locations. One illustrative configuration for a data center 704 that implements some of the technologies disclosed herein for integrating an automated computing architecture configuration service 102 within the service provider network 120 will be described below with regard to FIG. 7.

The customers and other users of the service provider network 120 may access the computing resources provided by the service provider network 120 over a network 130, such as a wide area network (WAN). For example, and without limitation, a customer computing system 132 might be utilized to access the service provider network 120 by way of the network 130. It should be appreciated that a local-area network (LAN), the Internet, or any other networking topology known in the art that connects the data centers 704 to remote customers and other users may be utilized. It should also be appreciated that combinations of such networks might also be utilized.

Figure 8:
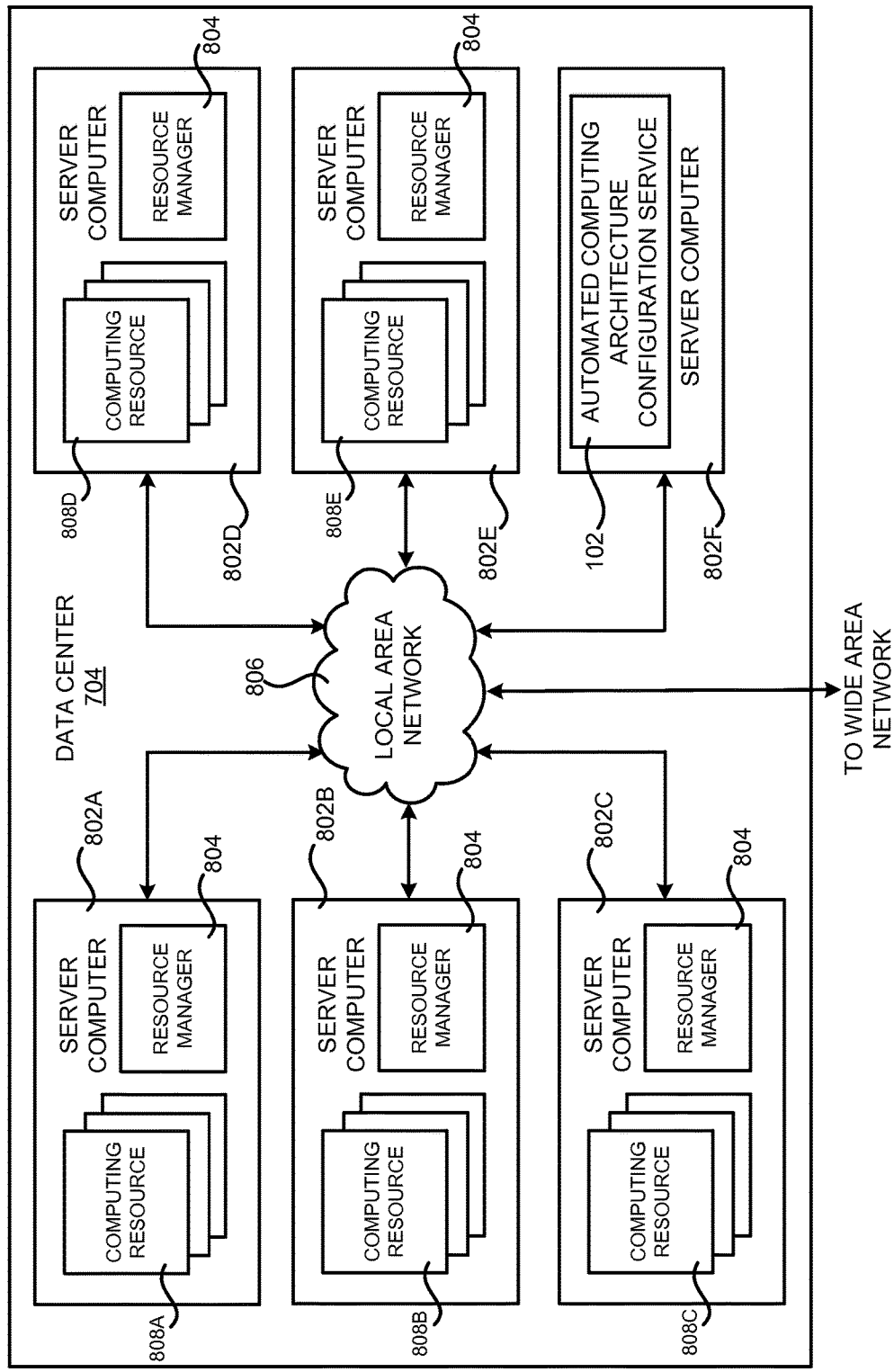
FIG. 8 is a computing system diagram that illustrates a configuration for a data center that may be utilized to implement aspects of the concepts and technologies disclosed herein.

FIG. 8 is a computing system diagram that illustrates one configuration for a data center 704 that implements aspects of the concepts and technologies disclosed herein for implementing an automated computing architecture configuration service 102, according to one configuration disclosed herein. The example data center 704 shown in FIG. 8 includes several server computers 802A-802F (which may be referred to herein singularly as "a server computer 802" or in the plural as "the server computers 802") for providing computing resources 808A-808E.

The server computers 802 may be standard tower, rack-mount, or blade server computers configured appropriately for providing the computing resources described herein. As mentioned above, the computing resources might be data processing resources such as virtual machine instances or hardware computing systems, data storage resources, database resources, networking resources, and others. Some of the servers 802 might also be configured to execute a resource manager 804 capable of instantiating and/or managing the computing resources based on a computing architecture template 106. In the case of virtual machine instances, for example, the resource manager 804 might be a hypervisor or another type of program configured to enable the execution of multiple virtual machine instances on a single server 802 based on declarations in the computing architecture template 106, for example. Server computers 802 in the data center 704 might also be configured to provide network services and other types of services, some of which are described in detail below with regard to FIG. 9.

The data center 704 shown in FIG. 8 also includes a server computer 802F that may be utilized for executing some or all of the software components described above. For example, and without limitation, the server computer 802F might be configured to execute the automated computing architecture configuration service 102, which has been described in detail above. The server computer 802F might also be configured to execute other components and/or store data for providing some or all of the functionality described herein.

In the example data center 704 shown in FIG. 8, an appropriate LAN 806 is utilized to interconnect the server computers 802A-802F. The LAN 806 is also connected to the network 130 illustrated in FIG. 7. It should be appreciated that the configuration and network topology illustrated in FIGS. 1 and 7-8 has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 704A-704N, between each of the server computers 802A-802F in each data center 704, and, potentially, between computing resources in each of the data centers 704. It should be appreciated that the configuration of the data center 704 described with respect to FIG. 8 is merely illustrative and that other implementations might be utilized.

Figure 9:
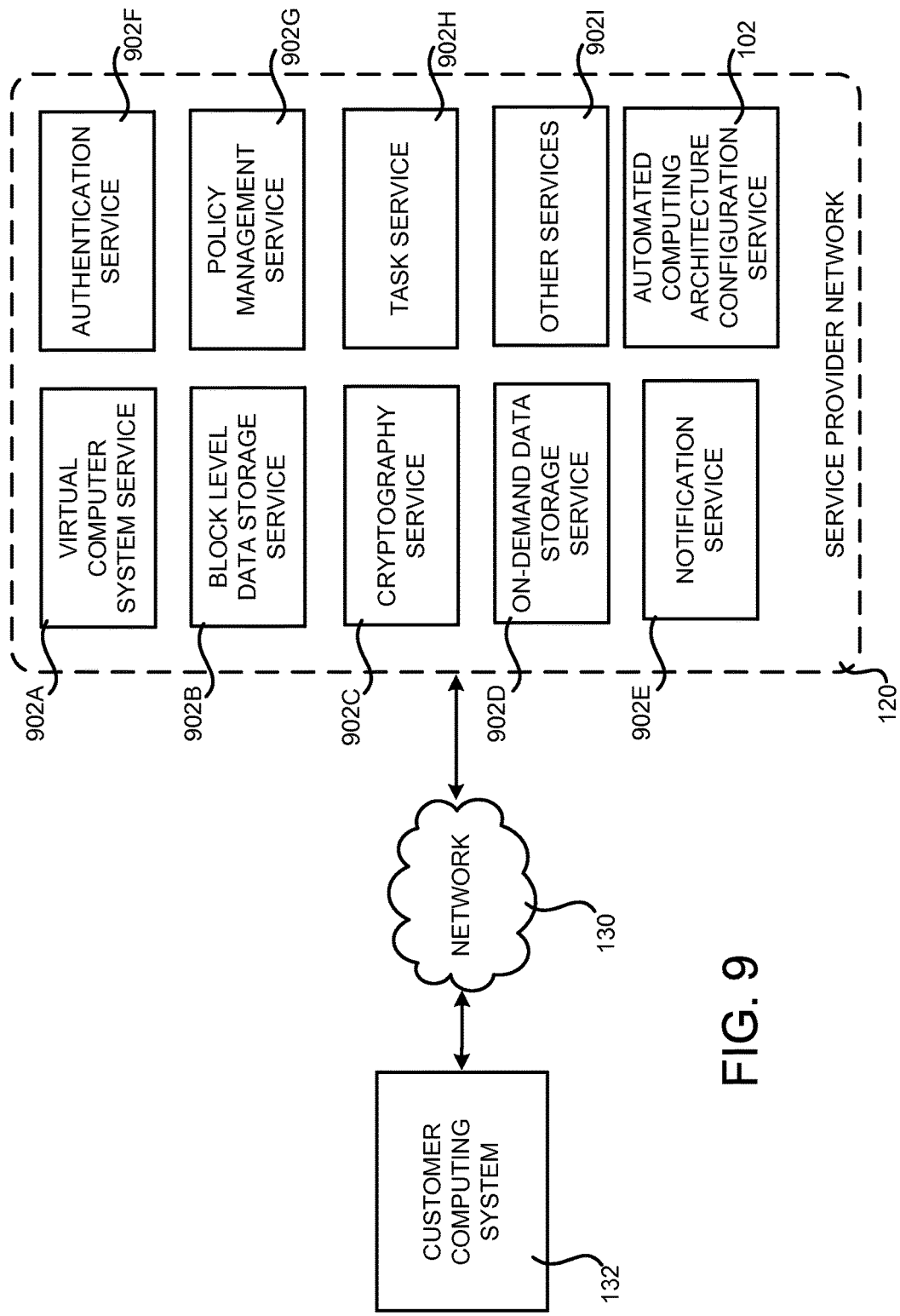
FIG. 9 is a system and network diagram that shows aspects of several services that might be provided by and utilized within a service provider network in one configuration disclosed herein.

FIG. 9 is a system and network diagram that shows aspects of several services 902 that might be provided by and utilized within a service provider network 120 in one configuration disclosed herein. In particular, FIG. 9 shows an example of a customer computing system 132 connected to the service provider network 120 through a network 130 in one example. As discussed briefly above, the service provider network 120 may provide a variety of services 902 to customers of the service provider network 120, including but not limited to, the automated computing architecture configuration service 102 for automated generation of one or more computing architecture templates 106 and/or service proposals 114.

It should be appreciated that customers of the service provider network 120 may be an organization that may utilize the services provided by the service provider network 120. Additionally, customers of the service provider network 120 may be individuals that utilize the services provided by the service provider network 120. As shown in FIG. 9, a customer may communicate with the service provider network 120 through a network 130, which may be a communication network, such as the Internet, an intranet or an Internet service provider (ISP) network. Communications from the customer computing system 132 to the service provider network 120 may cause the services provided by the service provider network 120 to operate in accordance with configurations described or variations thereof.

As discussed briefly above, the service provider network 120 may provide various types of network services to its customers. The services provided by the service provider network 120, in this example, include a virtual computer system service 902A, a block-level data storage service 902B, a cryptography service 902C, an on-demand data storage service 902D, a notification service 902E, an authentication service 902F, a policy management service 902G, a task service 902H and, potentially, other services 902I. The service provider network 120 may also provide the automated computing architecture configuration service 102 for use internally and by external customers.

It is noted that not all configurations described include the services 902A-902I described with reference to FIG. 9 and additional services may be provided in addition to or as an alternative to services explicitly described. Each of the services 902A-902I may include web service interfaces that enable a caller to submit appropriately configured API calls to the various services through web service requests. In addition, each of the services may include service interfaces that enable the services to access each other (e.g., to enable a virtual computer system of the virtual computer system service 902A, to store data in or retrieve data from the on-demand data storage service 902D, and/or to access block-level data storage devices provided by the block level data storage service 902B). Additional details regarding the services 902A-902H shown in FIG. 9 will now be provided.

The virtual computer system service 902A may be a collection of computing resources configured to instantiate virtual machine instances. For example, a customer of the service provider network 120 may interact with the virtual computer system service 902A (via appropriately configured and authenticated API calls) to provision and operate virtual computer systems that are instantiated on physical computing devices hosted and operated by the service provider network 120. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the virtual computer system service 902A is shown in FIG. 9, any other computer system or computer system service may be utilized in the service provider network 120, such as a computer system or computer system service that does not employ virtualization or instantiation and instead provisions computing resources on dedicated or shared computers/ servers and/or other physical devices.

The block-level data storage service 902B may comprise computing resources that collectively operate to store data using block-level storage devices (and/or virtualizations thereof). The block-level storage devices of the block-level data storage service 902B may, for instance, be operationally attached to virtual computer systems provided by the virtual computer system service 902A to serve as logical units (e.g., virtual drives) for the computer systems. A block-level storage device may enable the persistent storage of data used/generated by a corresponding virtual computer system where the virtual computer system service 902A may only provide ephemeral data storage.

The service provider network 120 may also include a cryptography service 902C. The cryptography service 902C may utilize storage services of the service provider network 120 to store encryption keys in encrypted form, whereby the keys may be usable to decrypt customer keys accessible only to particular devices of the cryptography service 902C. The cryptography service 902C might also provide other types of functionality not specifically mentioned herein.

The service provider network 120 further includes an on-demand data storage service 902D. The on-demand data storage service 902D may be a collection of computing resources configured to synchronously process requests to store and/or access data. The on-demand data storage service 902D may operate using computing resources (e.g., databases) that enable the on-demand data storage service 902D to locate and retrieve data quickly, so as to allow data to be provided in responses to requests for the data. For example, the on-demand data storage service 902D may maintain stored data in a manner such that, when a request for a data object is retrieved, the data object can be provided (or streaming of the data object can be initiated) in a response to the request. As noted, data stored in the on-demand data storage service 902D may be organized into data objects. The data objects may have arbitrary sizes except, perhaps, for certain constraints on size. Thus, the on-demand data storage service 902D may store numerous data objects of varying sizes. The on-demand data storage service 902D may operate as a key value store that associates data objects with identifiers of the data objects which may be used to retrieve or perform other operations in connection with the data objects stored by the on-demand data storage service 902D.

The service provider network 120 might also provide a notification service 902E in some configurations. The notification service 902E may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 902E may provide notifications to clients using a "push" mechanism without the need to periodically check or "poll" for new information and updates. The notification service 902E may further be used for various purposes such as monitoring applications executing in the virtual computer system service 902A, workflow systems, time-sensitive information updates, mobile applications, and many others.

As illustrated in FIG. 9, the service provider network 120, in various configurations, includes an authentication service 902F and a policy management service 902G. The authentication service 902F, in one example, is a computer system (i.e., collection of computing resources) configured to perform operations involved in authentication of users of the customer. For instance, one of the services 902A-902E and 902G-902I may provide information from a user to the authentication service 902F to receive information in return that indicates whether or not the requests submitted by the user are authentic.

The policy management service 902G, in one example, is a computer system configured to manage policies on behalf of customers or internal users of the service provider network 120. The policy management service 902G may include an interface that enables customers to submit requests related to the management of policy. Such requests may, for instance, be requests to add, delete, change or otherwise modify policy for a customer or for other administrative actions, such as providing an inventory of existing policies and the like.

The service provider network 120, in various configurations, is also configured with a task service 902H. The task service 902H is configured to receive a task package and to enable executing tasks as dictated by the task package. The task service 902H may be configured to use any resource of the service provider network 120, such as instantiated virtual machines or virtual hosts, for executing the task. The task service 902H may configure the instantiated virtual machines or virtual hosts to operate using a selected operating system and/or a selected execution application in accordance with specified requirements.

The service provider network 120 may additionally maintain other services 902I based, at least in part, on the needs of its customers. For instance, the service provider network 120 may maintain a database service is some configurations. A database service may be a collection of computing resources that collectively operate to create, maintain, and allow queries to be performed on databases stored within the service provider network 120. For example, a customer of the service provider network 120 may operate and manage a database from the database service by utilizing appropriately configured API calls. This, in turn, may allow the customer to maintain and potentially scale the operations in the database. Other services include object-level archival data storage services, services that manage and/or monitor other services. The service provider network 120 might also be configured with other services not specifically mentioned herein.

Figure 10:
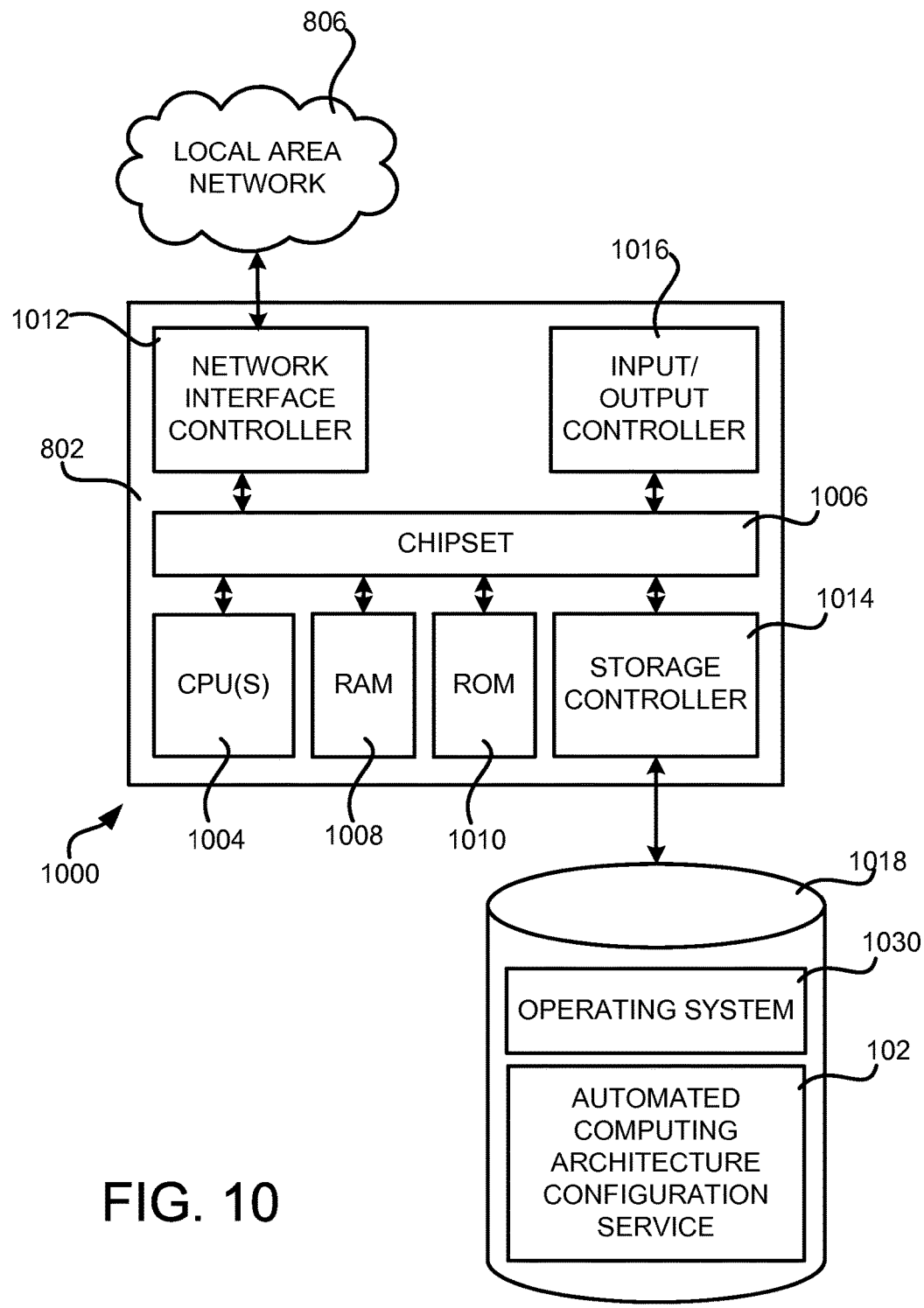
FIG. 10 is a computer architecture diagram showing an illustrative computer hardware architecture for implementing a computing device that might be utilized to implement aspects of the various technologies presented herein.

FIG. 10 shows an example computer architecture for a computer 800 capable of executing program components for implementing the automated computing architecture configuration service 102 in the manner described above. The computer architecture shown in FIG. 10 illustrates a conventional server computer, workstation, desktop computer, laptop, tablet, network appliance, e-reader, smartphone, or other computing device, and may be utilized to execute any of the software components presented herein. For example, the computer architecture shown in FIG. 10 may be utilized to execute software components for providing the automated computing architecture configuration service 102 and/or related functionality. The computer architecture shown in FIG. 10 might also be utilized to implement a customer computing system 132 or any other of the computing systems described herein.

The computer 1000 includes a baseboard 1002, or "motherboard," which is a printed circuit board to which a multitude of components or devices may be connected by way of a system bus or other electrical communication paths. In one illustrative configuration, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as a read-only memory (ROM) 1010 or non-volatile RAM (NVRAM) for storing basic routines that help to startup the computer 1000 and to transfer information between the various components and devices. The ROM 1010 or NVRAM may also store other software components necessary for the operation of the computer 1000 in accordance with the configurations described herein.

The computer 1000 may operate in a networked environment using logical connections to remote computing devices and computer systems through a network, such as the local area network 806. The chipset 1006 may include functionality for providing network connectivity through a NIC 1012, such as a gigabit Ethernet adapter. The NIC 1012 is capable of connecting the computer 1000 to other computing devices over the network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 1018 may store other system or application programs and data utilized by the computer 1000, such as the automated computing architecture configuration service 102, and/or any of the other software components and data described above. The mass storage device 1018 might also store other programs and data not specifically identified herein.

In one configuration, the mass storage device 1018 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various routines described above with regard to FIGS. 2-6. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for providing an automated computing architecture configuration service have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium comprising computer-executable instructions stored thereupon which, when executed by a computer, cause the computer to:
   receive information from a user indicating a requested performance level of a set of computing resources to be provided by a web service;
   access performance benchmark information corresponding to test results on a previously instantiated first set of computing resources capable of being provided by the web service;
   identify a proposed set of computing resources from among the first set of computing resources that meet or exceed the requested performance level based, at least in part, on the performance benchmark information;
   generate a computing resource template identifying the proposed set of computing resources, comprising to:
      identify at least one attribute of the set of computing resources not described in the information received from the user;
      apply descriptions of one or more parameters as invocations in the computing resource template, the one or more parameters being selected from use-case parameters, priority parameters, and default parameters; and
      resolve or record warnings arising from applying the descriptions for the one or more parameters;
   receive a description of services capable of being provided by a third party computing service;
   correlate the description with the computing resource template;
   generate a service proposal for the user, the service proposal including the computing resource template and the description; and
   deploy the proposed set of computing resources by the web service according to the computing resource template.

2. The non-transitory computer-readable storage medium of claim 1, further comprising:
   benchmark the performance of the computing resources capable of being provided by the web service, comprising:
      instantiate an instance of a computing resource; and
      record performance metrics for the instance.

3. The non-transitory computer-readable storage medium of claim 2, having further computer-executable instructions stored thereupon to:
   process and store the recorded performance metrics as performance benchmark information associated with the computing resource.

4. The non-transitory computer-readable storage medium of claim 1, wherein the applying the descriptions of the one or more parameters is performed sequentially for non-filled parameters in the computing resource template.

5. The non-transitory computer-readable storage medium of claim 1, further comprising to receive user selection of the computing resource template for deployment.

6. An apparatus for automated computing architecture configuration, the apparatus comprising:
   a processor; and
   a non-transitory computer-readable storage medium comprising instructions stored thereupon which are executable by the processor and which, when executed, cause the apparatus to provide an automated computing architecture configuration service configured to:
      receive information from a user indicating a requested performance level of a computing architecture to be provided by the web service;
      access performance benchmark information corresponding to test results on a previously instantiated plurality of computing architectures capable of being provided by a web service;
      identify a proposed computing architecture from among the plurality of computing architectures that meet or exceed the requested performance level based, at least in part, on the performance benchmark information;
      generate a computing architecture template identifying the proposed computing architecture, comprising to:
         identify at least one attribute of the set of computing resources not described in the information received from the user;
         apply descriptions of one or more parameters as invocations in the computing resource template, the one or more parameters being selected from use-case parameters, priority parameters, and default parameters; and
         resolve or record warnings arising from applying the descriptions for the one or more parameters;
      receive a description of services capable of being provided by a third party computing service;
      correlate the description with the computing resource template;
      generate a service proposal for the user, the service proposal including the computing resource template and the description; and deploy the proposed computing architecture by the web service according to the computing architecture template.

7. The apparatus of claim 6, wherein the information from the user includes performance criteria, and wherein the performance benchmark information includes benchmarks related to the performance criteria.

8. The apparatus of claim 7, wherein the performance criteria includes input/output operations per second (IOPS), maximum IOPS, an indication that associated data volumes should be striped, or types of storage necessary for operation of the computing architecture to be provided by the web service.

9. The apparatus of claim 6, wherein the information from the user includes an indication that the computing architecture to be provided by the web service is to conform to one or more industry standards or certifications, and wherein the performance benchmark information indicates that a particular benchmarked computing architecture conforms to the one or more industry standards or certifications.

10. The apparatus of claim 6, further comprising:
benchmark performance of the plurality of computing architectures capable of being provided by the web service, comprising:
instantiate an instance of a computing architecture of the plurality of computing architectures; and
record performance metrics for the instance of the computing architecture of the plurality of computing architectures to create at least a portion of the performance benchmark information.

11. The apparatus of claim 9, further comprising:
correlate attributes describing the one or more industry standards or certifications with the performance benchmark information to identify at least one proposed computing architecture that conforms to the one or more industry standards or certifications.

12. The apparatus of claim 6, wherein the plurality of computing architectures are deployable at a service provider network, and wherein the automated computing architecture configuration service is further configured to:
receive indication of a change or update to an infrastructure of the service provider network; and
update the performance benchmark information based on the received indication.

13. The apparatus of claim 12, wherein updating the benchmark results comprises:
instantiate an instance of a computing architecture of the plurality of computing architectures through the infrastructure of the service provider network; and
record performance metrics for the instance of the computing architecture of the plurality of computing architectures to create updated performance benchmark information.

14. The apparatus of claim 13, wherein the automated computing architecture configuration service is further configured to:
correlate the information from the user with the updated performance benchmark information to identify a new computing architecture that meets or exceeds performance of the desired computing architecture; and
generate a new computing architecture template describing the new computing architecture.

15. A computer-implemented method for providing an automated computing architecture configuration service in a service provider network, the method comprising performing computer-implemented operations for:
receiving information from a user indicating a requested performance level of a computing architecture to be provided by the web service;
retrieving performance benchmark information corresponding to test results on a previously instantiated first set of computing architectures capable of being provided by a web service;
identifying a proposed computing architecture from among the first set of computing architectures that meet or exceed the requested performance level based, at least in part, on the performance benchmark information;
generating a computing architecture template identifying the proposed computing architecture, comprising:
identifying at least one attribute of the set of computing resources not described in the information received from the user;
applying descriptions of one or more parameters as invocations in the computing resource template, the one or more parameters being selected from use-case parameters, priority parameters, and default parameters; and
resolving or recording warnings arising from applying the descriptions for the one or more parameters;
receiving a description of services capable of being provided by a third party computing service;
correlating the description with the computing resource template;
generating a service proposal for the user, the service proposal including the computing resource template and the description; and
instantiating the proposed computing architecture by the web service according to the computing architecture template.

16. The computer-implemented method of claim 15, wherein the first set of computing architectures are deployable at a service provider network, and wherein the method further comprises:
receiving indication of a change or update to an infrastructure of the service provider network; and
updating the performance benchmark information based on the received indication.

17. The computer-implemented method of claim 16, wherein updating the benchmark results comprises:
instantiating an instance of a computing architecture of the plurality of computing architectures through the infrastructure of the service provider network; and
recording performance metrics for the instance of the computing architecture of the first set of computing architecture to create updated performance benchmark information.

18. The computer-implemented method of claim 15, wherein the computing architecture to be provided by the web service conforms to one or more industry standards.

19. The computer-implemented method of claim 18, wherein the one or more industry standards are directed to a database standard or an enterprise resource planning standard.

20. The computer-implemented method of claim 15, further comprising receiving user selection of the computing resource template for deployment.

\* \* \* \* \*